US009735596B2

(12) United States Patent
Luo et al.

(10) Patent No.: US 9,735,596 B2
(45) Date of Patent: Aug. 15, 2017

(54) BATTERY CONTROL DEVICE, POWER STORAGE DEVICE, POWER STORAGE METHOD, AND PROGRAM

(71) Applicant: NEC Corporation, Tokyo (JP)

(72) Inventors: Yuan Luo, Tokyo (JP); Shinya Ohhata, Tokyo (JP); Junji Kogure, Tokyo (JP); Nobuhide Yoshida, Tokyo (JP); Shingo Takahashi, Tokyo (JP); Noriyuki Itabashi, Tokyo (JP)

(73) Assignee: NEC Corporation, Tokyo (JP)

( * ) Notice: Subject to any disclaimer, the term of this patent is extended or adjusted under 35 U.S.C. 154(b) by 172 days.

(21) Appl. No.: 14/440,526

(22) PCT Filed: Nov. 1, 2013

(86) PCT No.: PCT/JP2013/079689
§ 371 (c)(1),
(2) Date: May 4, 2015

(87) PCT Pub. No.: WO2014/073475
PCT Pub. Date: May 15, 2014

(65) Prior Publication Data
US 2015/0318726 A1    Nov. 5, 2015

(30) Foreign Application Priority Data

Nov. 9, 2012   (JP) .................. 2012-247572

(51) Int. Cl.
| | |
|---|---|
| *H02J 7/00* | (2006.01) |
| *H01M 10/44* | (2006.01) |
| *H01M 10/48* | (2006.01) |

(52) U.S. Cl.
CPC ......... *H02J 7/0047* (2013.01); *H01M 10/441* (2013.01); *H01M 10/482* (2013.01);
(Continued)

(58) Field of Classification Search
CPC ................... H02J 7/0047; H02J 7/007
(Continued)

(56) References Cited

U.S. PATENT DOCUMENTS

| | | |
|---|---|---|
| 5,422,560 A | 6/1995 | Yan |
| 2005/0077866 A1 | 4/2005 | Killian et al. |

(Continued)

FOREIGN PATENT DOCUMENTS

| | | |
|---|---|---|
| CA | 2541772 A1 | 4/2005 |
| JP | S59-206680 A | 11/1984 |

(Continued)

OTHER PUBLICATIONS

Extended European Search Report issued by the European Patent Office for Application No. 13852443.4 dated Jul. 12, 2016 (7 pages).

(Continued)

*Primary Examiner* — Sun Lin
(74) *Attorney, Agent, or Firm* — Wilmer Cutler Pickering Hale and Dorr LLP

(57) ABSTRACT

A battery control device includes: a measurement unit that individually measures an amount of discharging current of each discharging secondary battery of discharging secondary batteries among a plurality of secondary batteries which are independently charged and discharged; a time calculating unit that calculates time required for discharging said each discharging secondary battery until said each discharging secondary battery reaches a constant battery capacity based on a discharging current rate for said each discharging secondary battery which is calculated based on the amount of discharging current, and a state of charge (SOC) of said each discharging secondary battery; a number calculating unit that calculates an expected number of charging secondary batteries among said plurality of secondary batteries, (Continued)

which become fully charged in a required time, based on a charging current rate for each charging secondary battery of charging secondary batteries among said plurality of secondary batteries which is calculated based on an amount of charging current of said each charging secondary battery, a SOC of said each charging secondary battery, and the required time, and calculates a total value of the expected number and an existing number of said charging secondary batteries among said plurality of secondary batteries which are already fully charged; and a control unit that determines whether or not to raise the charging current rate based on the total value.

10 Claims, 9 Drawing Sheets

(52) U.S. Cl.
CPC ............ *H02J 7/007* (2013.01); *H02J 7/0021* (2013.01); *H02J 7/0022* (2013.01); *H02J 7/0078* (2013.01); *H02J 7/0083* (2013.01); *H02J 2007/005* (2013.01); *H02J 2007/0049* (2013.01)

(58) Field of Classification Search
USPC .......................................................... 320/134
See application file for complete search history.

(56) References Cited

U.S. PATENT DOCUMENTS

| | | |
|---|---|---|
| 2005/0236901 A1 | 10/2005 | Killian et al. |
| 2009/0033277 A1 | 2/2009 | Ludtke |
| 2009/0243549 A1 | 10/2009 | Matsumura et al. |
| 2010/0156184 A1 | 6/2010 | Ludtke |
| 2013/0196183 A1 | 8/2013 | Ludtke |

FOREIGN PATENT DOCUMENTS

| | | |
|---|---|---|
| JP | H02-270270 A | 11/1990 |
| JP | 2001-045677 A | 2/2001 |
| JP | 2007-508795 A | 4/2007 |
| JP | 2009-247108 A | 10/2009 |
| JP | 2009-296868 A | 12/2009 |
| JP | 2012-525117 A | 10/2012 |
| RU | 2329582 C2 | 7/2008 |
| RU | 91482 U1 | 2/2010 |
| WO | WO-2005/038951 A2 | 4/2005 |

OTHER PUBLICATIONS

Russian Office Action issued by the Federal Service on Intellectual Property for Application No. 2015121969/07(034201) dated Jul. 27, 2016 (20 pages).

International Search Report corresponding to PCT/JP2013/079689 mailed on Jan. 28, 2014 (2 pages).

Japanese Decision to Grant issued in corresponding Japanese Application No. 2012-247572, dated Nov. 29, 2016, 3 pages.

FIG. 4

| SECONDARY BATTERY | CHARGING/ DISCHARGING STATUS | SOC | CHARGING/ DISCHARGING RATE | REQUIRED TIME |
|---|---|---|---|---|
| 210a | DISCHARGING | 90% | 1C | 0.9h |
| 210b | DISCHARGING | 40% | 2C | 0.2h |
| 210c | CHARGING | 95% | 0.5C | (0.1h) |
| 210d | CHARGING | 80% | 0.5C | (0.4h) |
| 210e | CHARGING | 60% | 0.5C | (0.8h) |
| 210f | FULLY CHARGED | 100% | — | — |

| SECONDARY BATTERY | CHARGING/ DISCHARGING STATUS | SOC | CHARGING/ DISCHARGING RATE | REQUIRED TIME |
|---|---|---|---|---|
| 210a | DISCHARGING | 90% | 1C | 0.9h |
| 210b | DISCHARGING | 40% | 2C | 0.2h |
| 210c | CHARGING | 95% | 0.5C | (0.1h) |
| 210d | CHARGING | 80% | 1C | (0.2h) |
| 210e | CHARGING | 60% | 0.5C | (0.8h) |
| 210f | FULLY CHARGED | 100% | — | — |

<CONDITION>

PREDETERMINED NUMBER : 3 PIECES

CONSTANT BATTERY CAPACITY : 0%

FIG. 6

| SECONDARY BATTERY | CHARGING/ DISCHARGING STATUS | SOC | CHARGING/ DISCHARGING RATE | REQUIRED TIME |
|---|---|---|---|---|
| 210a | DISCHARGING | 90% | 1C | 0.9h |
| 210b | DISCHARGING | 40% | 2C | 0.2h |
| 210c | CHARGING | 95% | 0.5C | (0.1h) |
| 210d | CHARGING | 90% | 0.5C | (0.2h) |
| 210e | CHARGING | 60% | 0.5C | (0.8h) |
| 210f | FULLY CHARGED | 100% | — | — |

| SECONDARY BATTERY | CHARGING/ DISCHARGING STATUS | SOC | CHARGING/ DISCHARGING RATE | REQUIRED TIME |
|---|---|---|---|---|
| 210a | DISCHARGING | 90% | 1C | 0.9h |
| 210b | DISCHARGING | 40% | 2C | 0.2h |
| 210c | CHARGING | 95% | 0.25C | (0.2h) |
| 210d | CHARGING | 90% | 0.5C | (0.2h) |
| 210e | CHARGING | 60% | 0.5C | (0.8h) |
| 210f | FULLY CHARGED | 100% | — | — |

<CONDITION>
PREDETERMINED NUMBER : 3 PIECES
CONSTANT BATTERY CAPACITY : 0%

| IDENTIFICATION INFORMATION | SOH |
|---|---|
| aaa | 100% |
| bbb | 85% |
| ccc | 80% |
| ⋮ | ⋮ |

BATTERY CONTROL DEVICE, POWER STORAGE DEVICE, POWER STORAGE METHOD, AND PROGRAM

CROSS-REFERENCE TO RELATED APPLICATIONS

This application is a national stage application of International Application No. PCT/JP2013/079689 entitled "Battery Control Device, Power Storage Device, Power Storage Method, and Program," filed on Nov. 1, 2013, which claims the benefit of the priority of Japanese Patent Application No. 2012-247572, filed on Nov. 9, 2012, the disclosures of each of which are hereby incorporated by reference in their entirety.

TECHNICAL FIELD

The present invention relates to a battery control device that controls a secondary battery, a power storage device, a power storage method, and a program.

BACKGROUND ART

Recently, a secondary battery such as a lithium ion battery has been used in various fields so as to reduce environmental load. Deterioration of the secondary battery progresses while in use. To reduce the running cost of the secondary battery, it is necessary to suppress the progress of the deterioration.

Patent Document 1 and Patent Document 2 disclose a method of stably supplying electric energy for a long period of time by alternately charging and discharging two or more sets of secondary batteries so as to increase operational lifetime of the secondary batteries.

RELATED DOCUMENT

Patent Document

[Patent Document 1] Japanese Unexamined Patent Publication No. 59-206680
[Patent Document 2] Japanese Unexamined Patent Publication No. 02-270270

DISCLOSURE OF THE INVENTION

However, a discharging amount of the secondary battery on a discharging side may vary in accordance with an amount of electric power desired on a user side. In addition, if a state in which the amount of electric power desired on the user side is large continues, in a technology of the above-described patent documents, in a state in which charging of a secondary battery on a charging side is not sufficient, a secondary battery on a discharging side is apt to be discharged up to a battery capacity at which the charging side and the discharging side are switched, and thus there is a concern that an amount of electric power desired by the user may not be secured.

An object of the invention is to provide a battery control device, a power storage device, a power storage method, and a program which are capable of securing an amount of electric power of a secondary battery in a relatively stable manner.

According to an aspect of the invention, there is provided a battery control device including: a measurement unit that individually measures an amount of discharging current of a discharging secondary battery among a plurality of secondary batteries which are independently charged and discharged; a time calculating unit that calculates time required until the secondary battery has a constant battery capacity for each of the discharging secondary batteries on the basis of a discharging current rate for each of the secondary batteries which is calculated on the basis of the amount of discharging current, and a state of charge (SOC) of the secondary battery; a number calculating unit that calculates an expected number of the secondary batteries, which become fully charged in the required time, on the basis of a charging current rate for each of the secondary batteries which is calculated on the basis of an amount of charging current of the charging secondary battery, the SOC of the secondary battery, and the required time, and calculates a total value of the expected number and the existing number of secondary batteries which are already fully charged; and a control unit that determines whether or not to raise the charging current rate on the basis of the total value.

According to another aspect of the invention, there is provided a power storage device including: a plurality of secondary batteries which are independently charged and discharged; a measurement unit that individually measures an amount of discharging current of each of the discharging secondary batteries; a time calculating unit that calculates time required until the secondary battery has a constant battery capacity for each of the discharging secondary batteries on the basis of a discharging current rate for each of the secondary batteries which is calculated on the basis of the amount of discharging current, and a state of charge (SOC) of the secondary battery; a number calculating unit that calculates an expected number of the secondary batteries, which become fully charged in the required time, on the basis of a charging current rate for each of the secondary batteries which is calculated on the basis of an amount of charging current of the charging secondary battery, the SOC of the secondary battery, and the required time, and calculates a total value of the expected number and the existing number of secondary batteries which are already fully charged; and a control unit that determines whether or not to raise the charging current rate on the basis of the total value.

According to still another aspect of the invention, there is provided a power storage method including allowing a computer to: individually measure an amount of discharging current of a discharging secondary battery among a plurality of secondary batteries which are independently charged and discharged; calculate time required until the secondary battery has a constant battery capacity for each of the discharging secondary batteries on the basis of a discharging current rate for each of the secondary batteries which is calculated on the basis of the amount of discharging current, and a state of charge (SOC) of the secondary battery; calculate an expected number of the secondary batteries, which become fully charged in the required time, on the basis of a charging current rate for each of the secondary batteries which is calculated on the basis of an amount of charging current of the charging secondary battery, the SOC of the secondary battery, and the required time, and calculate a total value of the expected number and the existing number of secondary batteries which are already fully charged; and determine whether or not to raise the charging current rate on the basis of the total value.

According to still another aspect of the invention, there is provided a program that allows a computer function as: a measurement unit that individually measures an amount of discharging current of a discharging secondary battery among a plurality of secondary batteries which are independently charged and discharged; a time calculating unit that calculates time required until the secondary battery has a constant battery capacity for each of the discharging secondary batteries on the basis of a discharging current rate for each of the secondary batteries which is calculated on the basis of the amount of discharging current, and a state of charge (SOC) of the secondary battery; a number calculating unit that calculates an expected number of the secondary batteries, which become fully charged in the required time, on the basis of a charging current rate for each of the secondary batteries which is calculated on the basis of an amount of charging current of the charging secondary battery, the SOC of the secondary battery, and the required time, and calculates a total value of the expected number and the existing number of secondary batteries which are already fully charged; and a control unit that determines whether or not to raise the charging current rate on the basis of the total value.

According to the invention, it is possible to secure an amount of electric power of a secondary battery in a relatively stable manner.

BRIEF DESCRIPTION OF THE DRAWINGS

The above and other objects, advantages and features of the present invention will be more apparent from the following description of certain preferred exemplary embodiments taken in conjunction with the accompanying drawings.

FIG. 4 is a view illustrating a flow of raising a charging current rate by the battery control device.

FIG. 6 is a view illustrating a flow of lowering a charging current rate by the battery control device.

FIG. 8 is a view illustrating an example of information that is stored in an SOH storage unit.

DESCRIPTION OF EXEMPLARY EMBODIMENTS

Figure 1:
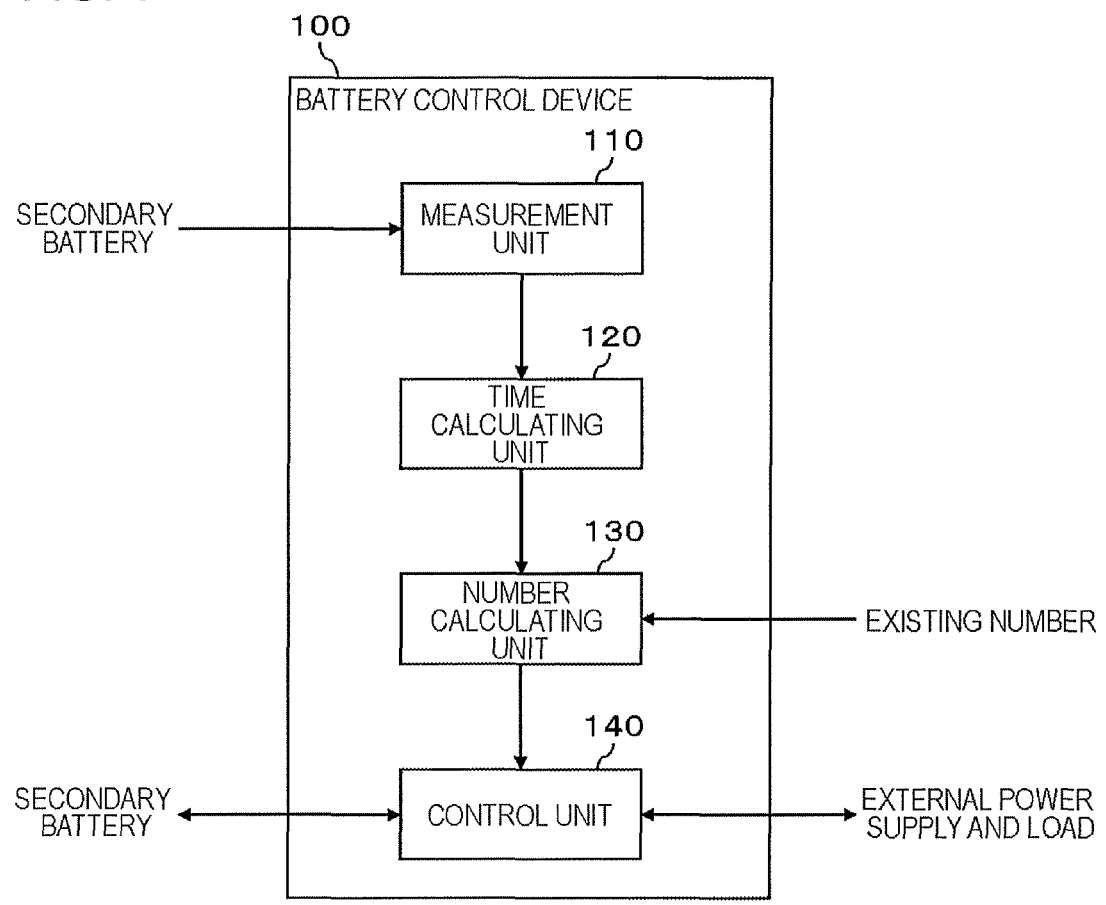
FIG. 1 is a view illustrating a configuration example of a battery control device according to a first exemplary embodiment.

Hereinafter, exemplary embodiments of the invention will be described with reference to the accompanying drawings. In all drawings, like reference numerals will be given to like constituent elements having substantially the same functions, and description thereof will not be repeated.

In addition, in the following description, respective processing units of a battery control device 100 indicate a block in a function unit instead of a configuration in a hardware unit. The respective processing units of the battery control device 100 are realized by a CPU, a memory, a program loaded to the memory to realize component elements of the accompanying drawings, a storage medium such as a hard disk that stores the program, and an arbitrary combination of hardware and software with a focus on a network connection interface in an arbitrary computer. In addition, a method and a device for realization thereof include various modification examples.

First Exemplary Embodiment

FIG. 1 is a view illustrating a configuration example of the battery control device 100 according to a first exemplary embodiment. The battery control device 100 includes a measurement unit 110, a time calculating unit 120, a number calculating unit 130, and a control unit 140.

The measurement unit 110 is connected to a plurality of secondary batteries (not illustrated), and individually measures an amount of discharging current of a discharging secondary battery among the plurality of secondary batteries. In addition, measurement unit 110 further measures an amount of charging current, a voltage value, and the like of a charging secondary battery. In this exemplary embodiment, the measurement unit 110 includes a determination unit (not illustrated) that determines whether or not the secondary battery becomes fully charged by using a measured voltage value and the like. In addition, the determination unit stores the number (existing number) of the secondary batteries which are determined as the fully charged state in an existing number storage unit (not illustrated) such as a memory and a hard disk.

The time calculating unit 120 calculates time required until the discharging secondary battery reaches a constant battery capacity. Specifically, the time calculating unit 120 calculates a discharging current rate of the secondary battery on the basis of the amount of discharging current of the discharging secondary battery which is measured by the measurement unit 110. Here, the discharging current rate is expressed with a unit "C". In addition, a discharging current rate of "1 C" represents a state in which a discharging current flows at a rate at which a secondary battery in a fully charged state is completely discharged in one hour. In addition, the time calculating unit 120 calculates time required until the secondary battery reaches a constant battery capacity for each of the discharging secondary batteries on the basis of the discharging current rate that is calculated, and a state of charge (SOC) of the secondary battery. Here, for example, the "constant battery capacity" may be set to a battery capacity of 0% (completely discharged state) or a battery capacity of 10% or 20% with a margin to some extent, or may be set by a user in an arbitrary manner in accordance with a use and the like.

The number calculating unit 130 calculates a total value of an expected number of the secondary batteries which become fully charged in the required time calculated by the time calculating unit 120, and the number of secondary batteries which are already fully charged. Specifically, the number calculating unit 130 calculates the charging current rate of the secondary battery on the basis of the amount of charging current of the charging secondary battery. Here, the charging current rate is expressed by the unit "C" similar to the discharging current rate. Here, a charging current rate of "1 C" represents a state in which a charging current flows at a rate at which a secondary battery in a fully discharged state is completely charged in one hour. In addition, the number calculating unit 130 calculates the number of secondary batteries (expected number), which become fully charged in the required time, on the basis of the charging current rate that is calculated, the SOC of each of the secondary batteries, and the required time that is calculated for each of the discharging secondary batteries. Here, for example, the number calculating unit 130 calculates the expected number of the secondary batteries which become fully charged on the basis of the shortest required time among required times of the discharged secondary batteries which are calculated by the time calculating unit 120. In addition, the number calculating unit 130 calculates a total value of the expected number that is calculated, and the existing number that is stored in the existing number storage unit.

The control unit 140 determines whether or not to raise the amount of charging current of the charging secondary batteries on the basis of the total value that is calculated by the number calculating unit 130. Specifically, the control unit 140 determines whether or not the total value calculated by the number calculating unit satisfies the number of secondary batteries necessary for preparation of a desired amount of electric power. In addition, in a case where it is determined that the number of secondary batteries necessary for preparation of the desired amount of electric power is not satisfied, the control unit 140 raises the charging current rate of the charging secondary batteries. In addition, the control unit 140 connects the plurality of secondary batteries to an external power supply (for example, a centralized power supply) and a load. In addition, for example, the control unit 140 includes an alternating current (AC)-direct current (DC) converting unit (not illustrated). For example, during charging of the secondary batteries, the control unit 140 converts power from the centralized power supply to DC power by using the AC-DC converting unit. In addition, during discharging of the secondary batteries, the control unit 140 converts power from the secondary batteries to AC power by using the AC-DC converting unit.

Figure 2:
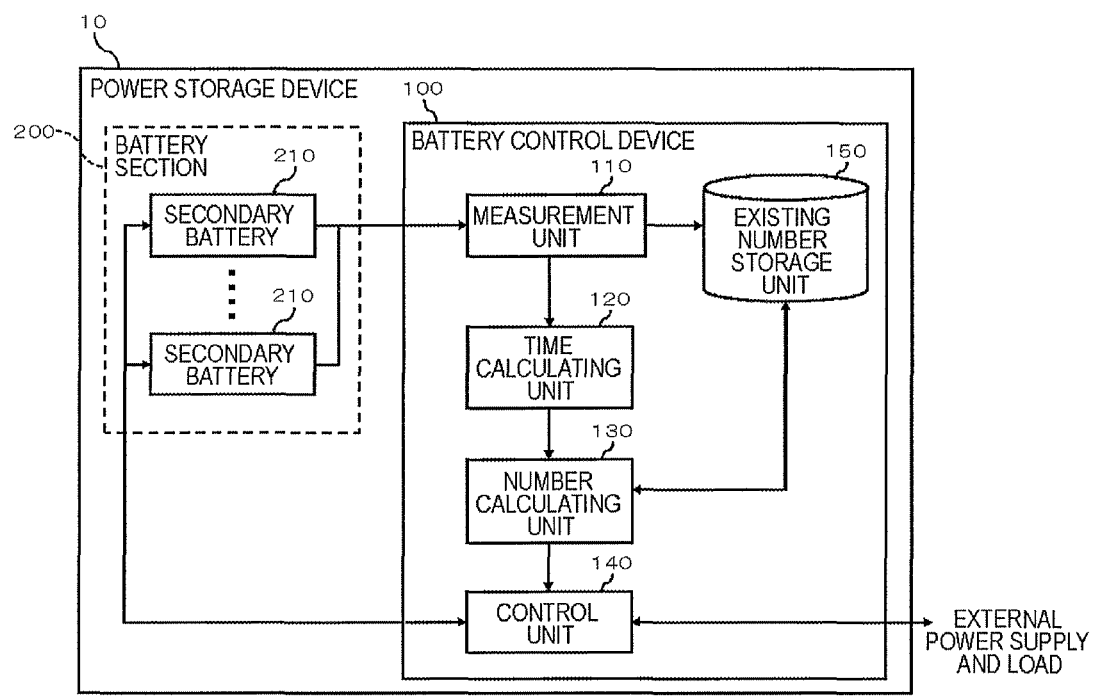
FIG. 2 is a view illustrating a configuration example of a power storage device according to the first exemplary embodiment.

FIG. 2 is a view illustrating a configuration example of a power storage device 10 according to the first exemplary embodiment. The power storage device 10 includes the battery control device 100 and a battery section 200. In FIG. 2, the battery control device 100 further includes an existing number storage unit 150. In addition, the existing number storage unit 150 may be provided to other devices which are located at the outside of the battery control device 100. The battery section 200 includes a plurality of secondary batteries 210. The plurality of secondary batteries 210 can be independently charged and discharged under the control of the control unit 140. Here, for example, the secondary batteries 210 are lithium ion secondary batteries. The secondary batteries 210 may be obtained by connecting a plurality of secondary battery packages in series. Each of the second battery packages may be obtained by connecting a plurality of secondary battery cells in parallel.

Figure 3:
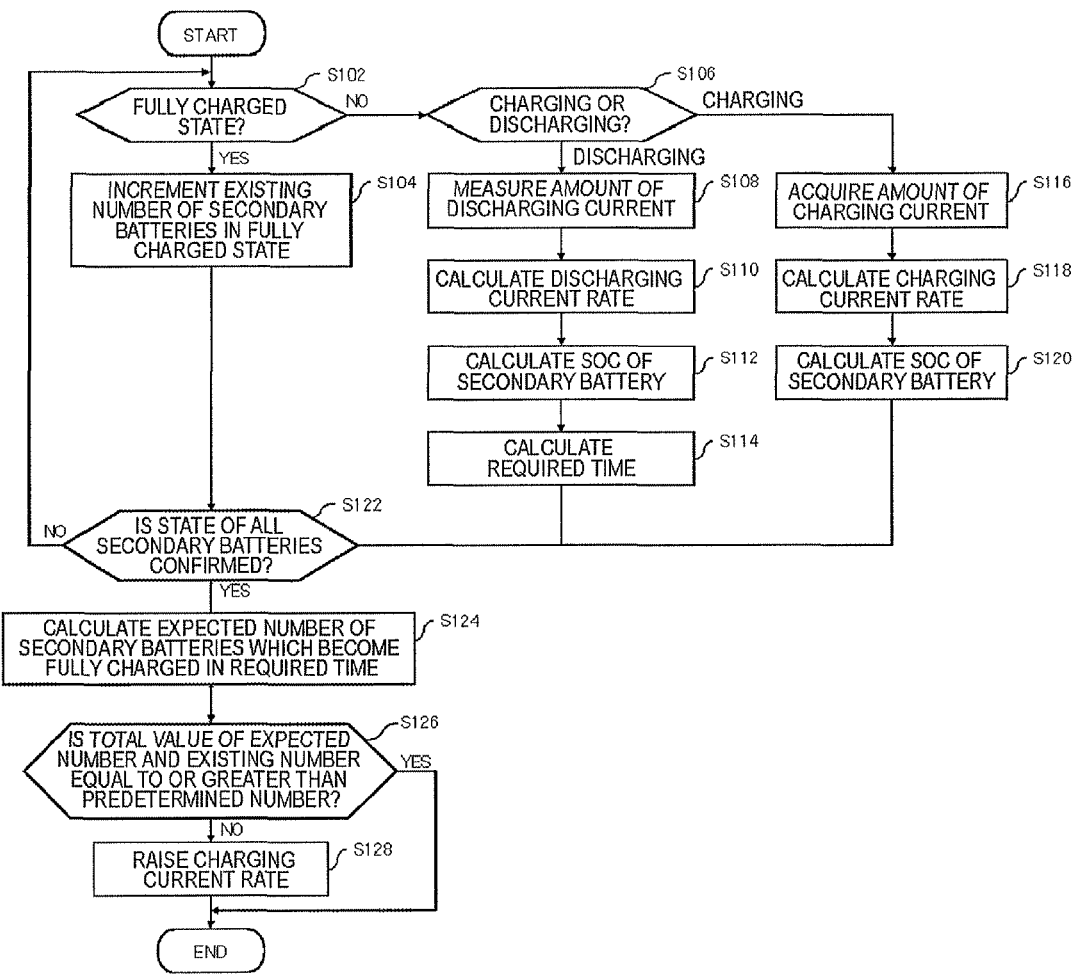
FIG. 3 is a flowchart illustrating a process flow of the battery control device according to the first exemplary embodiment.

A process flow of the battery control device 100 according to this exemplary embodiment will be described with reference to FIG. 3. FIG. 3 is a flowchart illustrating a process flow of the battery control device 100 according to the first exemplary embodiment.

The battery control device 100 selects an arbitrary secondary battery 210 that is a target among a plurality of secondary batteries which are in a connected state, and determines whether or not the secondary battery 210 is in a fully charged state (S102). In a case where the secondary battery 210 that is a target is in the fully charged state (YES in S102), the battery control device 100 increments an existing number of the secondary batteries 210 in the fully charged state (S104), and stores the existing number in the existing number storage unit 150. On the other hand, in a case where the state of the secondary battery 210 that is the target is not in the fully charged state (NO in S102), the battery control device 100 determines whether the secondary battery 210 is in a state of discharging or charging (S106).

In a case where the secondary battery 210 that is a target is discharging (discharging in S106), the battery control device 100 measures an amount of discharging current of the secondary battery 210 (S108). In addition, the battery control device 100 calculates a discharging current rate of the secondary battery 210 on the basis of the amount of discharging current that is measured in S108, and a fully charged battery capacity (S110). For example, the discharging current rate can be calculated by using the following Equation 1.

[Mathematical Formula 1]

$$\text{DISCHARGING CURRENT RATE [C]} = \frac{\text{AMOUNT OF DISCHARGING CURRENT [A]}}{\text{FULLY CHARGED BATTERY CAPACITY [Ah]}} \quad \text{(EQUATION 1)}$$

In addition, the battery control device 100 calculates an SOC of the secondary battery 210 on the basis of a current battery capacity of the discharging secondary battery 210 and a fully charged battery capacity thereof (S112). For example, the SOC can be calculated by using the following Equation 2.

[Mathematical Formula 2]

$$SOC[\%] = \frac{\text{CURRENT BATTERY CAPACITY [Ah]}}{\text{FULLY CHARGED BATTERY CAPACITY [Ah]}} \times 100 \quad \text{(EQUATION 2)}$$

In addition, the battery control device 100 calculates time required until the secondary battery 210 reaches a constant battery capacity on the basis of the discharging current rate that is calculated in S110, and the SOC of the discharging secondary battery 210 which is calculated in S112 (S114). For example, the required time can be calculated by using the following Equation 3. The battery control device 100 temporarily stores the required time, which is calculated, in a storage region of a memory and the like.

[Mathematical Formula 3]

$$\text{REQUIRED TIME [h]} = \frac{\text{SOC OF DISCHARGING SECONDARY BATTERY [\%]}}{\text{DISCHARGING CURRENT RATE [C]}} \quad \text{(EQUATION 3)}$$

On the other hand, in a case where the secondary battery 210 that is a target is charging (charging in S106), the battery control device 100 acquires an amount of charging current of the secondary battery 210 (S116). Here, as the amount of charging current, a predetermined amount of current based on product specifications of the secondary battery 210 may be stored in advance in the storage region of the memory and the like and the stored value may be used, or an actual measurement value that is measured by the measurement unit 110 and the like may be used. In addition, it is preferable to use the value that is measured by the measurement unit 110 and the like when considering calculation of a charging completion time with accuracy. In addition, the battery control device 100 calculates a charging current rate of the secondary battery 210 on the basis of the amount of charging current that is acquired in S116 (S118). For example, the charging current rate can be calculated by using the following Equation 4.

[Mathematical Formula 4]

$$\text{CHARGING CURRENT RATE [C]} = \frac{\text{AMOUNT OF CHARGING CURRENT [A]}}{\text{FULLY CHARGED BATTERY CAPACITY [Ah]}} \quad \text{(EQUATION 4)}$$

In addition, as is the case with the discharging secondary battery 210, the battery control device 100 calculates an SOC of the charging secondary battery 210 (S120). The battery control device 100 temporarily stores the SOC, which is calculated, in the storage region of the memory and the like.

In addition, the battery control device 100 determines whether or not the state of all secondary batteries 210 is confirmed (S122). In a case where the confirmation of the state with respect to all of the secondary batteries 210 is not completed (NO in S122), the above-described processes (S102 to S120) are repeated so as to confirm the state of a secondary battery 210 that is not confirmed yet. On the other hand, in a case where the state of all of the secondary batteries 210 is confirmed (YES in S122), the battery control device 100 transitions the subsequent process (S124).

The battery control device 100 calculates an expected number of the secondary batteries 210 of which charging is completed in the required time on the basis of the required time that is calculated in S114, the charging current rate that is calculated in S118, and the SOC that is calculated in S120 (S124). For example, in a predetermined secondary battery 210 being charged, in a case where the charging current rate is 1 C, and the SOC is 50%, the battery control device 100 can calculate that 0.5 h are taken until charging of the secondary battery 210 is completed. In addition, the battery control device 100 determines whether or not charging of the secondary battery 210 is completed in the required time in accordance with whether or not the required time is equal to or greater than 0.5 h to calculate the expected number. In addition, a method of calculating the expected number is not limited thereto. For example, the expected number can be calculated by a method in which a battery capacity chargeable in the required time is calculated on the basis of the charging current rate of the predetermined secondary battery 210 and the required time, and determination of whether or not the calculated battery capacity is deficient for setting of the SOC of the secondary battery 210 to 100% is performed. Here, when calculating the expected number, the battery control device 100 may use the shortest required time among respective required times calculated in S114, or may use a required time taken until the secondary batteries 210 in a number exceeding a predetermined threshold value reach a constant battery capacity. Here, description will be made with respect to a case where the battery control device 100 uses the shortest required time as an example.

In addition, the battery control device 100 determines whether or not the total value of the expected number that is calculated in S124 and the existing number that is stored in the existing number storage unit 150 in S104 is equal to or greater than a predetermined number (S126). Here, for example, the predetermined number is the number of the secondary batteries 210 with which a desired amount of electric power, which is set in advance by a user on the basis of demand forecasting and the like, can be secured. According to this, the predetermined number is appropriately changed in accordance with an installation environment, a use, and the like of the power storage device 10. In a case where the total value is less than a predetermined number (NO in S126), the battery control device 100 determines that it is difficult to prepare a necessary number of secondary batteries 210 in the fully charged state after passage of the required time, and thus it is difficult to secure the desired amount of electric power. In this case, the battery control device 100 performs control so as to prepare the necessary number of secondary batteries 210 in the fully charged state by raising the charging current rate (S128).

Here, in a case of raising the charging current rate, the battery control device 100 may raise the charging current rate of all of the charging secondary batteries 210, or may raise the charging current rate of parts of the secondary batteries 210. In a case of raising the charging current rate of parts of the secondary batteries 210, it is preferable that the battery control device 100 performs sequential selection from a secondary battery 210 that is the closest to the fully charged state among the charging secondary batteries 210 which do not become fully charged in the required time as a target of which the charging current rate is to be raised. According to this manner, it is possible to reduce an increment width of the charging current rate of the selected secondary battery 210, and thus it is possible to suppress deterioration of the secondary battery 210 while securing a desired amount of electric power. In addition, the battery control device 100 calculates the number of the secondary batteries 210 of which the charging current rate is to be raised from a difference between the predetermined number, and the total value of the expected number and the existing number which is to be calculated in S126. For example, in a case where the predetermined number is 5, and the total value that is calculated in S126 is 3, the battery control device 100 can calculate that the number of the secondary batteries 210 of which the charging current rate is to be raised is "5−3=2". In this case, among the charging secondary batteries 210 which do not become fully charged in the required time, the battery control device 100 selects a secondary battery 210 that is the closest to the fully charged state and a secondary battery 210 that is second closest to the fully charged state as a target of which the charging current rate is to be raised.

In addition, for each of the selected secondary batteries 210, the battery control device 100 calculates an amount of charging current that becomes a charging current rate, with which charging of the secondary battery 210 is completed in the required time, on the basis of a remaining battery capacity until the secondary battery 210 becomes fully charged, and the required time that is calculated in S114. In this case, for example, a new amount of charging current is calculated by using the following Equation 5.

[Mathematical Formula 5]

$$\text{AMOUNT OF CHARGING CURRENT [A]} = \frac{\text{FULLY CHARGED BATTERY CAPACITY [Ah]} \times \left(100[\%] - \frac{SOC \text{ OF CHARGING}}{\text{SECONDARY BATTERY [\%]}}\right)}{\text{REQUIRED TIME [h]}} \quad \text{(EQUATION 5)}$$

In addition, the battery control device 100 charges the secondary battery 210 with the amount of charging current that is calculated by using the Equation 5 so as to raise the charging current rate of the secondary battery 210, and then completes the charging in the required time.

On the other hand, in a case where the total value is equal to or greater than the predetermined number (YES in S126), the battery control device 100 determines that it is possible to prepare a necessary number of secondary batteries 210 in the fully charged state after passage of the required time, and thus it is possible to secure the desired amount of electric power. In this case, the battery control device 100 terminates the process without changing the charging current rate of the charging secondary batteries 210.

For example, the battery control device 100 executes the above-described processes (S102 to S128) for each predetermined interval, or for each time that is determined in advance to control the charging current rate of each of the secondary batteries 210.

An example of raising the charging current rate by the battery control device 100 will be described with reference to FIG. 4. FIG. 4 is a view illustrating a flow of raising the charging current rate by the battery control device 100.

In FIG. 4, the required time of a secondary battery 210b is "0.2 h", and the secondary battery 210b reaches the constant battery capacity at the earliest time. In addition, in only a secondary battery 210c, charging is completed in 0.2 h. That is, only in two secondary batteries including the secondary battery 210c and a secondary battery 210f, charging is completed after passage of 0.2 h. Accordingly, it is necessary to complete charging of another secondary battery so as to satisfy the predetermined number. Accordingly, the battery control device 100 performs control of raising a charging current rate of one of charging secondary batteries 210d and 210e which do not reach the fully charged state in the required time in order for charging thereof to be completed in the required time. Here, the battery control device 100 selects the secondary battery 210d that is the closest to the fully charged state as a target of which the charging current rate is to be raised. Here, when a battery capacity of the fully charged secondary battery 210d is set to 5 [Ah], a new amount of charging current of the secondary battery 210d which is calculated by using Equation 5 becomes 5 [Ah]×(100−80) [%]/0.2 [h]=5 [A]. This value is an amount of charging current with which the charging current rate becomes "1 C" in the secondary battery 210d. In addition, the battery control device 100 charges the secondary battery 210d with an amount of charging current with which a charging current rate becomes two times (1.0 C) the original current rate (0.5 C). According to this, charging of the secondary battery 210d is completed in 0.2 h. Accordingly, when the secondary battery 210b reaches a constant battery capacity, it is possible to prepare a predetermined number of secondary batteries in the fully charged state.

As described above, in this exemplary embodiment, the discharging current rate is calculated for each of the discharging secondary batteries 210 on the basis of the amount of discharging current that is measured by the measurement unit 110. In addition, for each of the discharging secondary batteries 210, the time, which is required until the secondary battery reaches a predetermined battery capacity, is calculated on the basis of the discharging current rate of the discharging secondary battery 210 which is calculated, and the SOC of the secondary battery 210. In addition, the charging current rate is calculated for each of the charging secondary batteries 210 on the basis of the amount of charging current of the charging secondary battery 210. In addition, the expected number of the secondary batteries 210 which becomes fully charged in the required time is calculated on the basis of the calculated charging current rate of the charging secondary battery 210, the SOC of the secondary battery 210, and the required time. In addition, it is determined whether or not a predetermined number of secondary batteries 210 capable of securing a desired amount of electric power can be prepared in the required time on the basis of the expected number of the secondary batteries 210 which becomes fully charged in the required time that is calculated, and the existing number of the secondary batteries which are already fully charged. In addition, whether or not the charging current rate of the charging secondary battery 210 is to be raised is controlled on the basis of the determination result.

As described above, according to this exemplary embodiment, when the discharging secondary battery reaches the constant battery capacity, it is possible to secure a necessary number of secondary batteries in the fully charged state, and it is possible to stably secure an amount of electric power which a user desires.

In addition, in this exemplary embodiment, the battery control device 100 may raise the charging current rate of secondary batteries 210 in order from one belonging to a specific group that is set in advance. Here, the specific group represents a group to which a secondary battery 210, which is preferentially selected by the control unit 140 as a target of which the charging current rate is to be changed, belongs. In this case, in the process of S128, the battery control device 100 selects a target of which the charging current rate is to be raised among the secondary batteries 210 which do not become fully charged in the required time and belong to the specific group.

In addition, for example, the above-described specific group can be classified on the basis of the state of health (SOH) of each of the secondary batteries 210. For example, the SOH can be calculated by using the following Equation 6.

[Mathematical Formula 6]

$$SOH[\%] = \frac{\text{FULLY CHARGED BATTERY CAPACITY AT THE TIME OF DETERIORATION [Ah]}}{\text{FULLY CHARGED INITIAL BATTERY CAPACITY [Ah]}} \times 100 \quad \text{(EQUATION 6)}$$

Here, the range of the SOH which is determined as the specific group is set by a user in an arbitrary manner. For example, the battery control device 100 determines the secondary battery 210, of which the SOH is in a range that is equal to or greater than 70% and less than 90%, as the above-described specific group. In addition, in a case where the SOH of a predetermined secondary battery 210 is equal to or greater than an upper limit of the range that is determined as the specific group (90% in the above-described range), the battery control device 100 may determine that the secondary battery 210 belongs to a typical charging group in which charging is typically performed with a charging current rate in accordance with product specifications. In addition, in a case where the SOH of the predetermined secondary battery 210 is less than the lower limit of the range that is determined as the specific group (70% in the above-described range), the battery control device 100 may determine that the secondary battery 210 belongs to a rapid charging group in which charging is typically performed in a state in which the charging current rate is raised. In this case, it is possible to tune the power storage device 10 in accordance with a use, and thus convenience is improved.

Second Exemplary Embodiment

A second exemplary embodiment is substantially the same as the first exemplary embodiment except for the following configurations.

In this exemplary embodiment, the number calculating unit 130 determines whether or not the secondary battery 210 of which charging is completed before the passage of the required time exists. Specifically, the number calculating unit 130 calculates time (charging completion time) required until charging is completed for each of the secondary batteries 210 on the basis of the charging current rate and the SOC of the charging secondary battery 210. In addition, the number calculating unit 130 compares the calculated charging completion time and the required time with each other and determines whether or not the secondary battery 210 of which charging is completed before the passage of the required time exists. In addition, the number calculating unit 130 transmits the result to the control unit 140.

In addition, the control unit 140 determines whether or not to lower the amount of charging current of the secondary battery 210 of which charging is completed before the passage of the required time on the basis of the result that is received from the number calculating unit 130.

Figure 5:
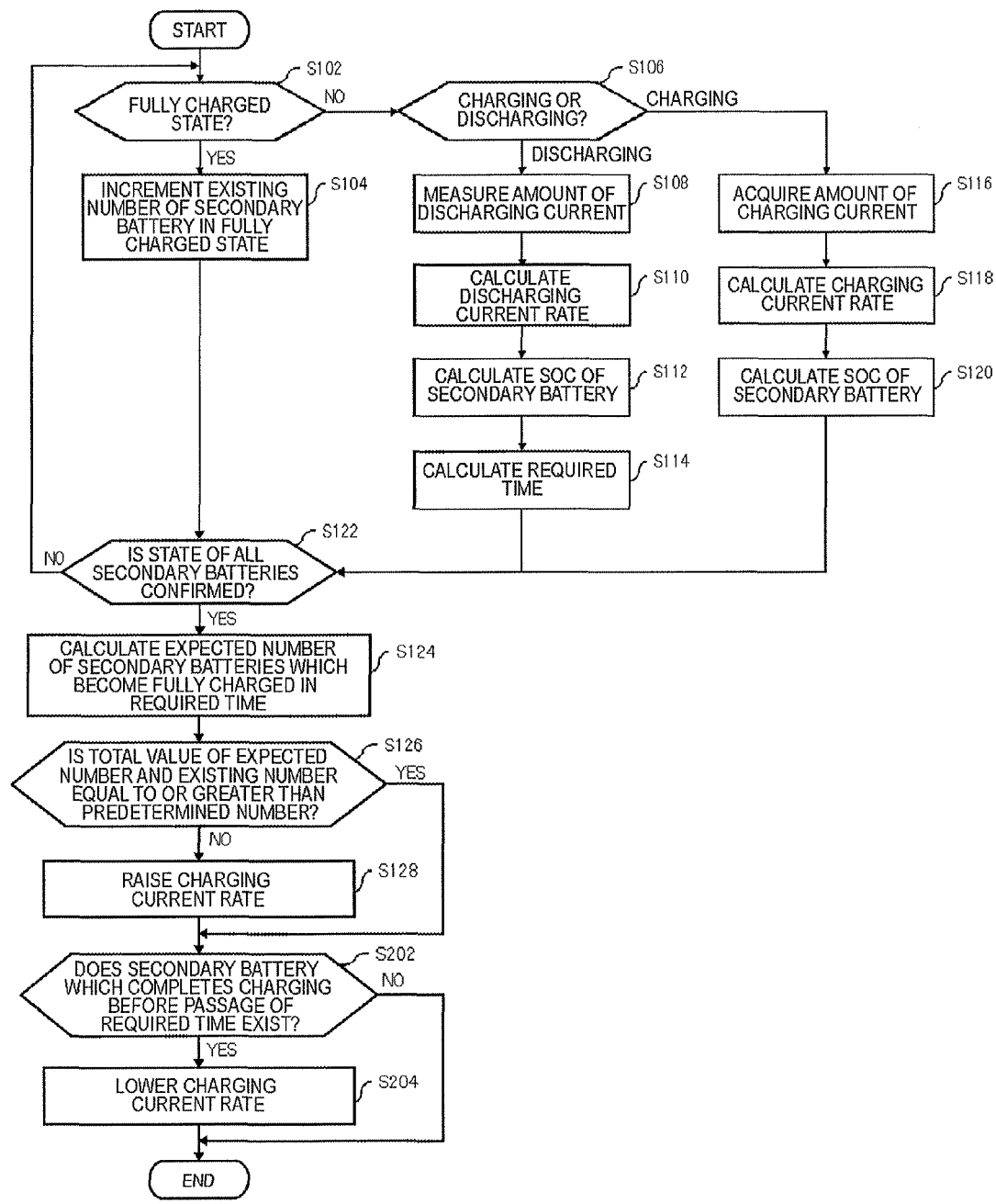
FIG. 5 is a flowchart illustrating a process flow of a battery control device according to a second exemplary embodiment.

A process flow of the battery control device 100 according to this exemplary embodiment will be described with reference to FIG. 5. FIG. 5 is a flowchart illustrating the process flow of the battery control device 100 according to the second exemplary embodiment.

The battery control device 100 determines whether or not a secondary battery 210, of which charging is completed before the passage of the required time, exists among the charging secondary batteries 210 (S202). Specifically, in S118, the battery control device 100 calculates the charging completion time of the secondary battery 210 on the basis of the charging current rate that is calculated in S118, and the SOC, which is calculated in S120, of each of the charging secondary batteries 210. In addition, the battery control device 100 can determine whether or not charging of the secondary battery 210 is completed before the passage of the required time by comparing the calculated charging completion time and the required time with each other. In addition, in a case where the secondary battery 210 of which charging is completed before the passage of the required time exists (YES in S202), the battery control device 100 lowers the charging current rate of the secondary battery 210 (S204).

Here, in the case of lowering the charging current rate, the battery control device 100 may lower the charging current rate of all secondary batteries 210 among the secondary batteries 210 of which charging is completed before the passage of the required time, or may lower the charging current rate of parts of the secondary batteries 210 for securement of electric power with a margin. In addition, as is the case with the first exemplary embodiment, the battery control device 100 can calculate a new charging current rate by using Equation 4.

On the other hand, in a case where the secondary battery 210 of which charging is completed before the passage of the required time does not exist (NO in S202), the battery control device 100 terminates the process without changing the charging current rate of the charging secondary batteries 210.

An example of lowering the charging current rate by the battery control device 100 will be described with reference to FIG. 6. FIG. 6 is a view illustrating a flow of lowering the charging current rate by the battery control device 100.

In FIG. 6, the required time of a secondary battery 210$b$ is "0.2 h", and the secondary battery 210$b$ reaches the constant battery capacity at the earliest time. In addition, in only a secondary battery 210$c$, charging is completed before passage of 0.2 h. Here, when a battery capacity of the fully charged secondary battery 210$c$ is set to 5 [Ah], a new amount of charging current of the secondary battery 210$c$ which is calculated by using Equation 5 becomes 5 [Ah]×(100−95) [%]/0.2 [h]=1.25 [A]. This value is an amount of charging current with which the charging current rate becomes "0.25 C" in the secondary battery 210$c$. In addition, the battery control device 100 charges the secondary battery 210$c$ with an amount of charging current with which a charging current rate (0.25 C) becomes 0.5 times the original charging current rate (0.5 C). According to this, even when lowering the charging current rate, it is possible to prepare a predetermined number of secondary batteries 210 in the fully charged state in the required time.

Hereinbefore, in this exemplary embodiment, the charging completion time is calculated for each of the secondary batteries 210 on the basis of the charging current rate and the SOC of the charging secondary battery 210. In addition, it is determined whether or not the secondary battery 210, of which charging is completed before the passage of the required time, exists on the basis of each charging completion time that is calculated and the required time. In addition, whether or not to lower the amount of charging current of the secondary battery 210 of which charging is completed before the passage of the required time is controlled on the basis of the result.

As described above, according to this exemplary embodiment, it is possible to suppress deterioration of the secondary batteries 210 while stably securing an amount of electric power which a user desires.

Third Exemplary Embodiment

A third exemplary embodiment is substantially the same as the first exemplary embodiment or the second exemplary embodiment except for the following configuration. Hereinafter, description will be made on the basis of the first exemplary embodiment.

In general, the secondary batteries deteriorate when repeating charging and discharging. Therefore, the battery control device 100 of this exemplary embodiment weights the number of the secondary batteries 210 in the fully charged state in accordance with deterioration that occurs in accordance with charging and discharging, and the like.

Figure 7:
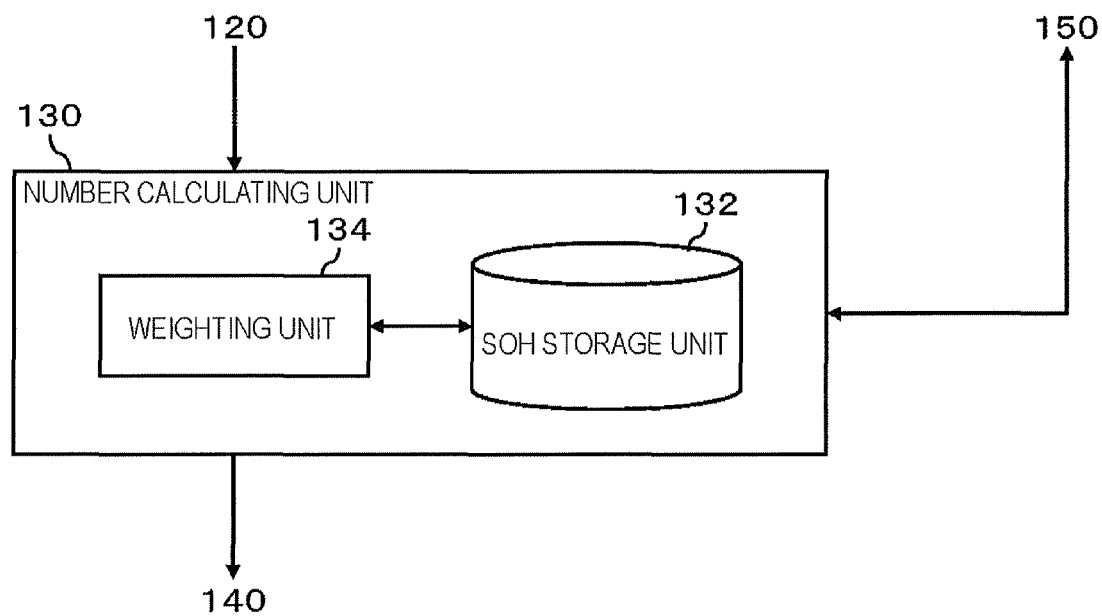
FIG. 7 is a view illustrating a configuration example of a battery control device according to a third exemplary embodiment.

FIG. 7 is a view illustrating a configuration example of the battery control device 100 according to the third exemplary embodiment. In this exemplary embodiment, the number calculating unit 130 includes an SOH storage unit 132 and a weighting unit 134.

The SOH storage unit 132 stores a deterioration state (SOH) for each of the secondary batteries 210. FIG. 8 is a view illustrating an example of information that is stored in the SOH storage unit 132. In FIG. 8, information, which is configured to individually identify each of the secondary batteries 210 included in the battery section 200, is stored in a column of identification information. Examples of the identification information include a serial number of each of the secondary batteries 210 and the like. In addition, SOH of each of the secondary batteries 210 is stored in a column of SOH. When charging of each of the secondary batteries 210 is completed, for example, the SOH is calculated by using Equation 6, and is stored in the SOH storage unit 132. In addition, the SOH storage unit 132 may be provided with other processing units other than the number calculating unit 130, or other devices which are located at the outside of the battery control device 100.

The weighting unit 134 reads out the SOH from the SOH storage unit 132 on the basis of the identification information for each of the secondary batteries 210, and weights the expected number and the existing number on the basis of the SOH.

Figure 9:
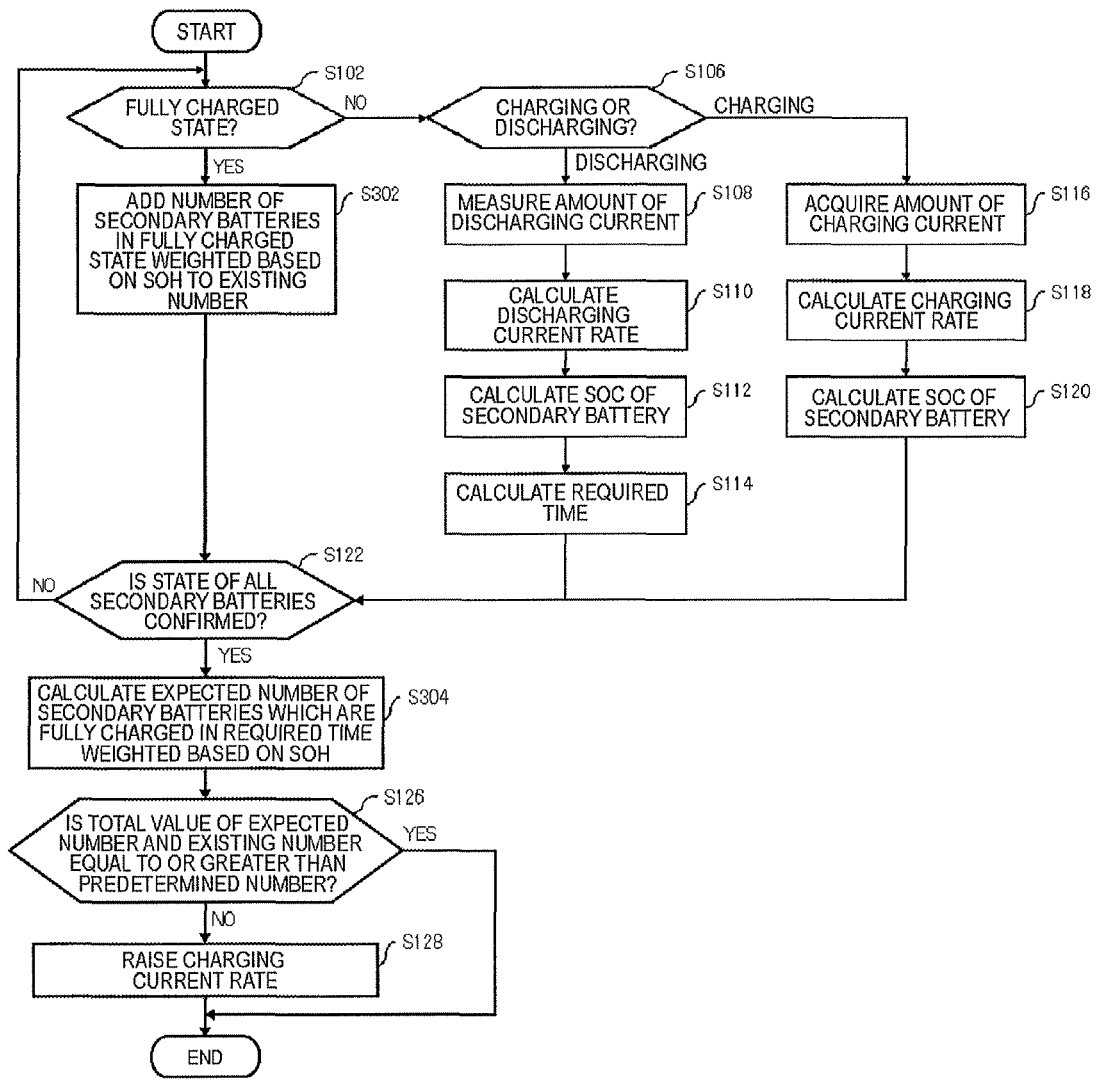
FIG. 9 is a flowchart illustrating a process flow of the battery control device according to the third exemplary embodiment.

A process flow of the battery control device 100 according to this exemplary embodiment will be described with reference to FIG. 9. FIG. 9 is a flowchart illustrating the process flow of the battery control device 100 according to the third exemplary embodiment.

In a case where the secondary batteries 210 as a target are in a fully charged state (YES in S102), the battery control device 100 adds the number of the secondary batteries in the fully charged state, which is weighted on the basis of the SOH, to the existing number (S302). Specifically, the battery control device 100 reads out the SOH of the secondary batteries 210 from the SOH storage unit 132 on the basis of the identification information of the secondary batteries 210 of which charging is already completed. In addition, the battery control device 100 adds the number, which is weighted on the basis of the SOH that is read out, to the existing number that is stored in the existing number storage unit 150. For example, in a case where plural pieces of information illustrated in FIG. 8 are stored in the SOH storage unit 132, and the identification information of the secondary battery 210 of which charging is already completed is "bbb", the battery control device 100 reads out "85%" as the SOH of the secondary battery 210. In addition, the battery control device 100 weights a value that is added to the existing number on the basis of the SOH that is read out. In this case, "1×85[%]=0.85 [pieces]" are added to the existing number.

In addition, the battery control device 100 calculates an expected number of the secondary batteries which are fully charged in the required time that is weighted on the basis of the SOH (S304). Specifically, on the basis of the identification information for each of the secondary batteries 210 which becomes fully charged in the required time, the battery control device 100 reads out the SOH of the secondary battery 210 from the SOH storage unit 132. In addition, the battery control device 100 adds the number that is weighted on the basis of the SOH that is read out to calculate the expected number. For example, in a case where the plural pieces of information illustrated in FIG. 8 are stored in the SOH storage unit 132, and the secondary batteries 210 to which identification information "aaa" and identification information "ccc" are given become fully charged in the required time, the battery control device 100 reads out "100%" and "80%" as the SOH of the secondary batteries 210. In addition, the battery control device 100 calculates the expected number on the basis of the SOH that is read out. In this case, the expected number to be calculated becomes "1×100 [%]+1×80 [%]=1.8 [pieces].

As described above, according to this exemplary embodiment, the expected number and the existing number are weighted in accordance with a deterioration state for each of the secondary batteries 210. In addition, it is determined whether or not a predetermined number of secondary batteries 210, which are capable of securing a desired amount of electric power, are secured on the basis of a total value of the expected number and the existing number which are weighted. According to this, it is possible to further stably secure an amount of electric power which a user desires.

Hereinbefore, the exemplary embodiments of the invention have been described with reference to the accompanying drawings, but these exemplary embodiments are illustrative only, and various configurations other than the above-described configuration can be employed. For example, in the above-described exemplary embodiments, the battery control device 100 may store a plurality of charging current rates which are divided step by step, and in the case of changing the charging current rates, a charging current rate, with which charging can be completed in the required time, may be selected.

In addition, in the plurality of flowcharts which are used in the description, a plurality of the processes are sequentially described, but an execution sequence of the processes which are executed in the exemplary embodiments is not limited to the sequence described therein. For example, in the exemplary embodiments, the sequence of the processes which are illustrated may be changed within a range not causing a problem in the contents thereof, for example, the processes may be executed in combination with each other. In addition, the exemplary embodiments can be combined with each other within a range in which the contents thereof are not contrary to each other.

In addition, according to the above-described exemplary embodiments, the following invention is disclosed.

(Additional Statement 1)

A battery control device including: a measurement unit that individually measures an amount of discharging current of a discharging secondary battery among a plurality of secondary batteries which are independently charged and discharged;

a time calculating unit that calculates time required until the secondary battery has a constant battery capacity for each of the discharging secondary batteries on the basis of a discharging current rate for each of the secondary batteries which is calculated on the basis of the amount of discharging current, and a state of charge (SOC) of the secondary battery;

a number calculating unit that calculates an expected number of the secondary batteries, which become fully charged in the required time, on the basis of a charging current rate for each of the secondary batteries which is calculated on the basis of an amount of charging current of the charging secondary battery, the SOC of the secondary battery, and the required time, and calculates a total value of the expected number and the existing number of secondary batteries which are already fully charged; and a control unit that determines whether or not to raise the charging current rate on the basis of the total value.

(Additional Statement 2)

The battery control device according Additional Statement 1, wherein the control unit raises the charging current rate of the charging secondary batteries which do not become fully charged in the required time in order from a secondary battery that is closest to full charge.

(Additional Statement 3)

The battery control device according to Additional Statement 1 or 2, wherein the control unit raises the charging current rate by an increment width of two or more times.

(Additional Statement 4)

The battery control device according to any one of Additional Statements 1 to 3, wherein the control unit lowers the charging current rate on the basis of a charging completion time for each of the charging secondary batteries, and the required time.

(Additional Statement 5)

The battery control device according to any one of Additional Statements 1 to 4, wherein the control unit raises the charging current rate in order from a secondary battery belonging to a specific group that is set as a target of which the charging current rate is preferentially raised.

(Additional Statement 6)

The battery control device according to Additional Statement 5, wherein the specific group is classified on the basis of a state of health (SOH) of each of the plurality of secondary batteries.

(Additional Statement 7)

The battery control device according to any one of Additional Statements 1 to 6, wherein the number calculating unit weights the expected number and the existing number on the basis of the SOH for each of the plurality of secondary batteries.

(Additional Statement 8)

A power storage device, including:

a plurality of secondary batteries which are independently charged and discharged;

a measurement unit that individually measures an amount of discharging current of each of the discharging secondary batteries;

a time calculating unit that calculates time required until the secondary battery has a constant battery capacity for each of the discharging secondary batteries on the basis of a discharging current rate for each of the secondary batteries which is calculated on the basis of the amount of discharging current, and a state of charge (SOC) of the secondary battery;

a number calculating unit that calculates an expected number of the secondary batteries, which become fully charged in the required time, on the basis of a charging current rate for each of the secondary batteries which is calculated on the basis of an amount of charging current of the charging secondary battery, the SOC of the secondary battery, and the required time, and calculates a total value of the expected number and the existing number of secondary batteries which are already fully charged; and a control unit that determines whether or not to raise the charging current rate on the basis of the total value.

(Additional Statement 9)

A power storage method, including allowing a computer to:

individually measure an amount of discharging current of a discharging secondary battery among a plurality of secondary batteries which are independently charged and discharged;

calculate time required until the secondary battery has a constant battery capacity for each of the discharging secondary batteries on the basis of a discharging current rate for each of the secondary batteries which is calculated on the basis of the amount of discharging current, and a state of charge (SOC) of the secondary battery;

calculate an expected number of the secondary batteries, which become fully charged in the required time, on the basis of a charging current rate for each of the secondary batteries which is calculated on the basis of an amount of charging current of the charging secondary battery, the SOC of the secondary battery, and the required time, and calculate a total value of the expected number and the existing number of secondary batteries which are already fully charged; and determine whether or not to raise the charging current rate on the basis of the total value.

(Additional Statement 10)

A program that allows a computer to function as:

a measurement unit that individually measures an amount of discharging current of a discharging secondary battery among a plurality of secondary batteries which are independently charged and discharged;

a time calculating unit that calculates time required until the secondary battery has a constant battery capacity for each of the discharging secondary batteries on the basis of a discharging current rate for each of the secondary batteries which is calculated on the basis of the amount of discharging current, and a state of charge (SOC) of the secondary battery;

a number calculating unit that calculates an expected number of the secondary batteries, which become fully charged in the required time, on the basis of a charging current rate for each of the secondary batteries which is calculated on the basis of an amount of charging current of the charging secondary battery, the SOC of the secondary battery, and the required time, and calculates a total value of the expected number and the existing number of secondary batteries which are already fully charged; and a control unit that determines whether or not to raise the charging current rate on the basis of the total value.

(Additional Statement 11)

The power storage device according to Additional Statement 8, wherein the control unit raises the charging current rate of the charging secondary batteries which do not become fully charged in the required time in order from a secondary battery that is closest to full charge.

(Additional Statement 12)

The power storage device according to Additional Statement 8 or 11, wherein the control unit raises the charging current rate by an increment width of two or more times.

(Additional Statement 13)

The power storage device according to any one of Additional Statements 8, 11, and 12, wherein the control unit lowers the charging current rate on the basis of a charging completion time for each of the charging secondary batteries, and the required time.

(Additional Statement 14)

The power storage device according to any one of Additional Statements 8, and 11 to 13, wherein the control unit raises the charging current rate in order from a secondary battery belonging to a specific group that is set as a target of which the charging current rate is preferentially raised.

(Additional Statement 15)

The power storage device according to Additional Statement 14, wherein the specific group is classified on the basis of a state of health (SOH) of each of the plurality of secondary batteries.

(Additional Statement 16)

The power storage device according to any one of Additional Statements 8, and 11 to 15, wherein the number calculating unit weights the expected number and the existing number on the basis of the SOH for each of the plurality of secondary batteries.

(Additional Statement 17)

The power storage method according to Additional Statement 9, wherein the computer raises the charging current rate of the charging secondary batteries which do not become fully charged in the required time in order from a secondary battery that is closest to full charge.

(Additional Statement 18)

The power storage method according to Additional Statement 9 or 17, wherein the computer raises the charging current rate by an increment width of two or more times.

(Additional Statement 19)

The power storage method according to any one of Additional Statements 9, 17, and 18, wherein the computer lowers the charging current rate on the basis of a charging completion time for each of the charging secondary batteries, and the required time.

(Additional Statement 20)

The power storage method according to any one of Additional Statements 9, and 17 to 19, wherein the computer raises the charging current rate in order from a secondary battery belonging to a specific group that is set as a target of which the charging current rate is preferentially raised.

(Additional Statement 21)

The power storage method according to Additional Statement 20, wherein the specific group is classified on the basis of a state of health (SOH) of each of the plurality of secondary batteries.

(Additional Statement 22)

The power storage method according to any one of Additional Statements 9, and 17 to 21, wherein the computer weights the expected number and the existing number on the basis of the SOH for each of the plurality of secondary batteries.

(Additional Statement 23)

The program according to Additional Statement 10, wherein the computer is allowed to function as a unit that raises the charging current rate of the charging secondary batteries which do not become fully charged in the required time in order from a secondary battery that is closest to full charge.

(Additional Statement 24)

The program according to Additional Statement 10 or 23, wherein the computer is allowed to function as a unit that raises the charging current rate by an increment width of two or more times.

(Additional Statement 25)

The program according to any one of Additional Statements 10, 23, and 24, wherein the computer is allowed to function as a unit that lowers the charging current rate on the basis of a charging completion time for each of the charging secondary batteries, and the required time.

(Additional Statement 26)

The program according to any one of Additional Statements 10, and 23 to 25, wherein the computer is allowed to function as a unit that raises the charging current rate in order from a secondary battery belonging to a specific group that is set as a target of which the charging current rate is preferentially raised.

(Additional Statement 27)

The program according to Additional Statement 26, wherein the computer is allowed to function as a unit that classifies the plurality of secondary batteries into specific groups on the basis of a state of health (SOH) of each of the plurality of secondary batteries.

(Additional Statement 28)

The program according to any one of Additional Statements 10, and 23 to 27, wherein the computer is allowed to function as a unit that weights the expected number and the existing number on the basis of the SOH for each of the plurality of secondary batteries.

The present patent application claims priority from Japanese Patent Application No. 2012-247572 filed on Nov. 9, 2012, the disclosure of which is incorporated herein by reference.

The invention claimed is:

1. A battery control device, comprising:
a measurement unit that individually measures an amount of discharging current of each discharging secondary battery of discharging secondary batteries among a plurality of secondary batteries which are independently charged and discharged;
a time calculating unit that calculates time required for discharging said each discharging secondary battery until said each discharging secondary battery reaches a constant battery capacity based on a discharging current rate for said each discharging secondary battery which is calculated based on the amount of discharging current, and a state of charge (SOC) of said each discharging secondary battery;
a number calculating unit that calculates an expected number of charging secondary batteries among said plurality of secondary batteries, which become fully charged in a required time, based on a charging current rate for each charging secondary battery of charging secondary batteries among said plurality of secondary batteries which is calculated based on an amount of charging current of said each charging secondary battery, a SOC of said each charging secondary battery, and the required time, and calculates a total value of the expected number and an existing number of said charging secondary batteries among said plurality of secondary batteries which are already fully charged; and
a control unit that determines whether or not to raise the charging current rate based on the total value.

2. The battery control device according to claim 1,
wherein the control unit raises the charging current rate of said each charging secondary battery of the charging secondary batteries which do not become fully charged in the required time in order from a charging secondary battery that is closest to full charge.

3. The battery control device according to claim 1,
wherein the control unit raises the charging current rate by an increment width of two or more times.

4. The battery control device according claim 1,
wherein the control unit lowers the charging current rate based on a charging completion time for each charging battery of the charging secondary batteries, and the required time.

5. The battery control device according claim 1,
wherein the control unit raises the charging current rate of each charging secondary battery of said charging secondary batteries in a specific group which do not become fully charged in the required time in order from a charging secondary battery that is closest to full charge.

6. The battery control device according to claim 5,
wherein the specific group is classified based on a state of health (SOH) of each charging secondary battery of the charging secondary batteries among said plurality of secondary batteries.

7. The battery control device according to claim 6,
wherein the number calculating unit weights the expected number and the existing number based on the SOH for each charging secondary battery of the charging secondary batteries among said plurality of secondary batteries.

8. A power storage device, comprising:
a plurality of secondary batteries which are independently charged and discharged;
a measurement unit that individually measures an amount of discharging current of each discharging secondary battery of discharging secondary batteries among said plurality of secondary batteries;
a time calculating unit that calculates time required for discharging said each discharging secondary battery until said each discharging secondary battery reaches a constant battery capacity based on a discharging current rate for said each discharging secondary battery which is calculated based on the amount of discharging current, and a state of charge (SOC) of said each discharging secondary battery;
a number calculating unit that calculates an expected number of the charging secondary batteries among said plurality of secondary batteries, which become fully charged in a required time, based on a charging current rate for each charging secondary battery of charging secondary batteries among said plurality of secondary batteries which is calculated based on an amount of charging current of said each charging secondary battery, a SOC of said each charging secondary battery, and the required time, and calculates a total value of the expected number and an existing number of said charging secondary batteries among said plurality of secondary batteries which are already fully charged; and
a control unit that determines whether or not to raise the charging current rate based on the total value.

9. A power storage method, comprising a method allowing a computer to:
individually measure an amount of discharging current of a discharging secondary battery among a plurality of secondary batteries which are independently charged and discharged;
calculate time required for discharging said each discharging secondary battery until said each discharging secondary battery reaches a constant battery capacity based on a discharging current rate for said each discharging secondary battery which is calculated based on the amount of discharging current, and a state of charge (SOC) of said each discharging secondary battery;
calculate an expected number of charging secondary batteries among said plurality of secondary batteries, which become fully charged in a required time, based on a charging current rate for each charging secondary battery of charging secondary batteries among said plurality of secondary batteries which is calculated based on an amount of charging current of said each charging secondary battery, a SOC of said each charging secondary battery, and the required time, and calculate a total value of the expected number and the existing number of secondary batteries which are already fully charged; and
determine whether or not to raise the charging current rate based on the total value.

10. A non-transitory computer readable medium storing a program, the program that, when executed by a computer, causes the computer to function as:
a measurement unit that individually measures an amount of discharging current of each discharging secondary battery of discharging secondary batteries among a plurality of secondary batteries which are independently charged and discharged;
a time calculating unit that calculates time required for discharging said each discharging secondary battery until said each discharging secondary battery reaches a constant battery capacity based on a discharging current rate for said each discharging secondary battery which is calculated based on the amount of discharging current, and a state of charge (SOC) of said each discharging secondary battery;
a number calculating unit that calculates an expected number of charging secondary batteries among said plurality of secondary batteries, which become fully charged in a required time, based on a charging current rate for each charging secondary battery of charging secondary batteries among said plurality of secondary batteries which is calculated based on an amount of charging current of said each charging secondary battery, a SOC of said each charging secondary battery, and the required time, and calculates a total value of the expected number and an existing number of said charging secondary batteries among said plurality of secondary batteries which are already fully charged; and
a control unit that determines whether or not to raise the charging current rate based on the total value.

* * * * *